US009406084B2

(12) United States Patent
Havas

(10) Patent No.: US 9,406,084 B2
(45) Date of Patent: Aug. 2, 2016

(54) METHODS FOR SUBMITTING A FOOD ORDER REMOTELY

(71) Applicant: Specialty's Cafe & Bakery, Inc., San Francisco, CA (US)

(72) Inventor: Peter Havas, San Francisco, CA (US)

(73) Assignee: Specialty's Café & Bakery, Inc., San Francisco, CA (US)

(*) Notice: Subject to any disclaimer, the term of this patent is extended or adjusted under 35 U.S.C. 154(b) by 293 days.

(21) Appl. No.: 13/901,468

(22) Filed: May 23, 2013

(65) Prior Publication Data

US 2013/0317921 A1 Nov. 28, 2013

Related U.S. Application Data

(60) Provisional application No. 61/650,942, filed on May 23, 2012.

(51) Int. Cl.
G06Q 30/06 (2012.01)
G06Q 20/20 (2012.01)
G06Q 50/12 (2012.01)

(52) U.S. Cl.
CPC ............ *G06Q 30/0641* (2013.01); *G06Q 20/20* (2013.01); *G06Q 30/06* (2013.01); *G06Q 30/0601* (2013.01); *G06Q 30/0633* (2013.01); *G06Q 50/12* (2013.01)

(58) Field of Classification Search
CPC ....... G06Q 50/12; G06Q 20/20; G06Q 30/06; G06Q 30/0601; G06Q 30/0633; G06Q 30/0641
See application file for complete search history.

(56) References Cited

U.S. PATENT DOCUMENTS

| 5,991,739 A * | 11/1999 | Cupps et al. ................. 705/26.8 |
| 8,888,492 B2 * | 11/2014 | Riscalla ............. G06Q 30/0603 434/127 |
| 2001/0049636 A1 * | 12/2001 | Hudda et al. .................... 705/26 |
| 2004/0148226 A1 * | 7/2004 | Shanahan ........................ 705/26 |
| 2007/0073586 A1 * | 3/2007 | Dev ......................... G06Q 30/02 705/14.25 |
| 2007/0088624 A1 * | 4/2007 | Vaughn et al. .................. 705/26 |
| 2007/0162353 A1 * | 7/2007 | Borders et al. .................. 705/26 |
| 2007/0208629 A1 * | 9/2007 | Jung ................. G06Q 30/0603 705/26.43 |
| 2011/0238474 A1 * | 9/2011 | Carr et al. ................... 705/14.23 |
| 2012/0191551 A1 * | 7/2012 | Lutnick et al. .................. 705/15 |
| 2013/0132140 A1 * | 5/2013 | Amin et al. .................. 705/7.13 |
| 2013/0342574 A1 * | 12/2013 | Tseng ........................... 345/633 |

OTHER PUBLICATIONS

Apple, Inc.; Apple.com "Viewing & Changing Orders", found at https://web.archive.org/web/20110122161455/http://store.apple.com/us/help/viewing_changing_orders#status, Internet Archived on Jan. 22, 2011.*

* cited by examiner

*Primary Examiner* — Asfand Sheikh
(74) *Attorney, Agent, or Firm* — Oblon, McClelland, Maier & Neustadt, L.L.P.

(57) ABSTRACT

One variation of the method for submitting a food order remotely includes: generating a graphical icon representative of a food item and a customization option for the food item selected by a customer; associating the icon with a payment option; associating the icon with a store location to fulfill the food item; displaying the icon on a display of a mobile computing device; and, in response to receiving a selection of the icon, submitting a food order including the food item, the customization option, and the payment option to the store location.

12 Claims, 10 Drawing Sheets

METHODS FOR SUBMITTING A FOOD ORDER REMOTELY

CROSS-REFERENCE TO RELATED APPLICATIONS

This application claims the benefit of U.S. Provisional Application No. 61/650,942, filed on 23 May 2012, which is incorporated herein in its entirety by this reference.

TECHNICAL FIELD

This invention relates generally to the food industry, and more specifically to a new and useful method and system for enabling a remote food order in the food industry field.

BACKGROUND

Food providers such as restaurants and cafés often have many consumers who desire swift food service, such as those accustomed to relatively hurried lifestyles or desiring takeout food "to go". The total turnaround time for such a customer to receive his food (between when the customer enters a food provider store location and when the customer receives his food) is typically ideally minimized to increase overall sales and improve customer service and satisfaction. One strategy to minimize the turnaround time is to increase efficiency of the food provider, such as improving efficiency of food preparation. However, there is a limit in the level efficiency that a food provider can obtain, particularly without significantly including food quality. Furthermore, independent of food provider operations, a customer often must endure waiting to submit his order to the food provider and/or waiting for his order to be prepared. Thus, there is a need in the food industry field to create new and useful methods for submitting a food order remotely. This invention provides such new and useful methods.

DESCRIPTION OF THE EMBODIMENTS

The following description of embodiments of the invention is not intended to limit the invention to these embodiments, but rather to enable any person skilled in the art to make and use this invention.

1. First Method

Figure 1:
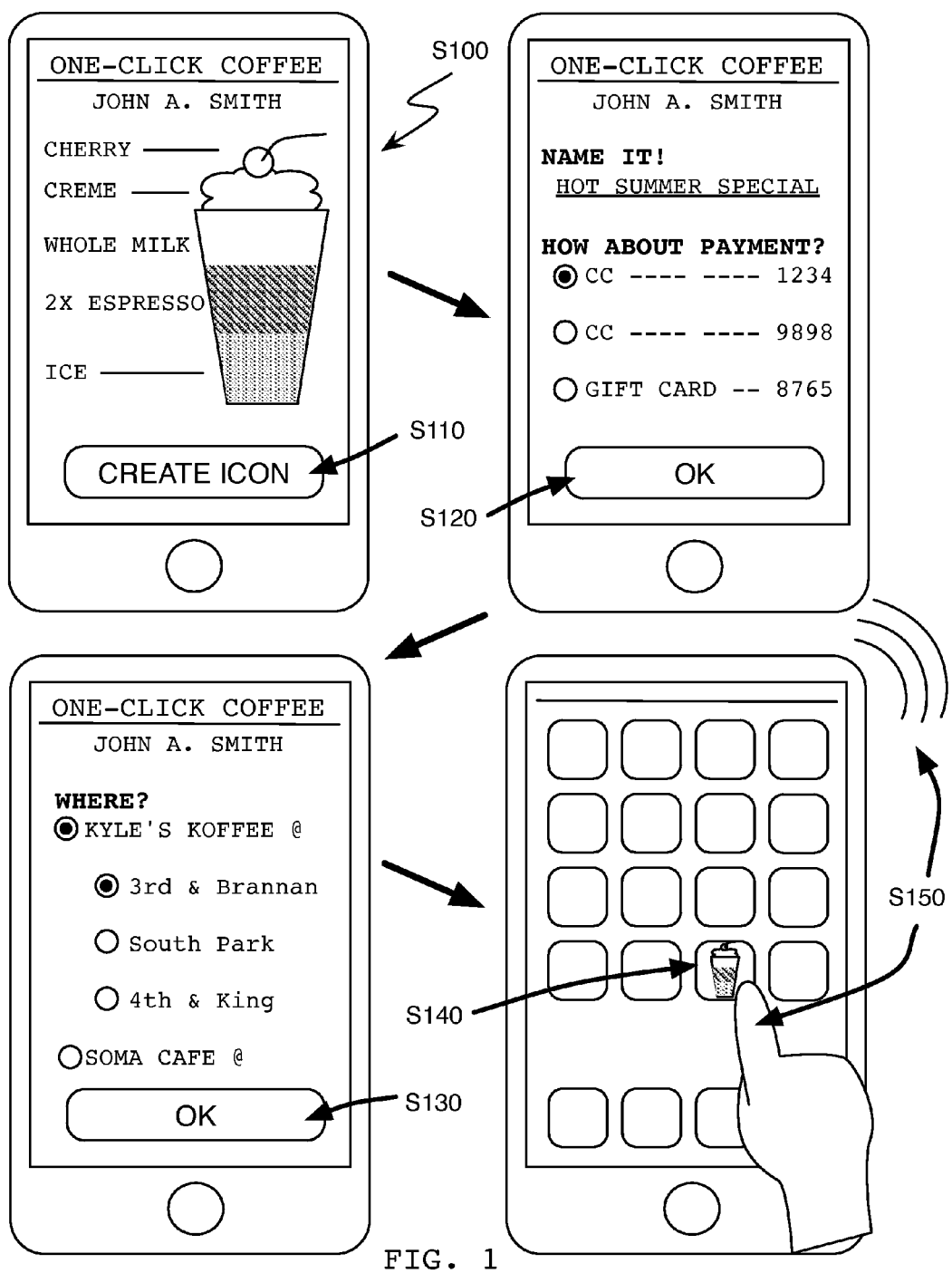
FIG. 1 is a flowchart representation of a first method.

As shown in FIG. 1, first method S100 for submitting a food order remotely includes: generating a graphical icon representative of a food item and a customization option for the food item selected by a customer in Block S110; associating the icon with a payment method in Block S120; associating the icon with a specific store location to fulfill the food item in Block S130; displaying the icon on a display of a mobile computing device in Block S140; and, in response to receiving a selection of the icon, submitting a food order including the food item, the customization option, and the payment method to the store location in Block S150.

Generally, first method S100 enables a customer to create, store, and submit a favorite food order on a mobile computing device, such as on the fly and before arriving at a particular store location (i.e., a food vendor location). For example, first method S100 can enable a customer to quickly submit a remote order for a favorite food item from any suitable location through a mobile computing device, thereby eliminating an in-store wait time that the customer would otherwise endure to submit his food order in person. First method S100 can thus enable the customer to apply his personal experience with food order completion times of a particular store location to submit an order for his favorite food item such that the store location completes the order before and/or approximately at the time that the customer arrives at the store location.

In particular, first method S100 generates and displays an icon representative of sufficient details of a food order to submit the order to a location store for fulfillment, including a food item, a payment method, and a particular store location to fulfill the order. The icon can be further associated with customization of the food item. For example, first method S100 can prompt the customer to select a favorite coffee drink (shown in FIG. 4B) and to select a favorite size of the coffee drink and a favorite milk option for the coffee drink (shown in FIGS. 4C and 4D), and first method S100 can further select a stock image representative of the favorite coffee drink in the favorite size and a stock overlay representative of the favorite milk option and combine the stock image and the stock overlay to generate the icon. First method S100 can further assign a payment method to and associate a favorite or default store location with the icon according to a customer selection (shown in FIG. 4D) and, in response to customer selection of the icon, submit the food order including the coffee drink, the coffee drink size, the milk option, and the payment method to the favorite or default store location.

In one implementation, first method S100 displays the icon as a native application icon on a home screen of a mobile computing device, such as a tablet or a smartphone. In this implementation, when a customer selects the icon on the home screen of the mobile computing device, first method S100 can automatically send the food order (i.e., the food item, the customization option(s) for the food item, and the payment method, etc.) to an associated store location. First method S100 can further execute the native application on the mobile computing device, including opening an interface through which the customer can cancel and/or confirm the food order, such as within a limited period of time (e.g., one minute). Therefore, in this implementation, a customer can submit a complete food order including a customized food item and a payment method to a particular (e.g., favorite, default, nearest) store location with a single input into a mobile computing device.

In another implementation, first method S100 displays the icon within a native food ordering application executing on a mobile computing device. In this implementation, once a customer selects a native food ordering application form a home screen on the mobile computing device, the native food ordering application opens and first method S100 displays the single icon within a home screen of the native food ordering application. When the customer selects the icon within the home screen of the native food ordering application, first method S100 can automatically send the food order to an associated store location. Furthermore, in response to selection of the icon, first method S100 can display a second screen through which the customer can cancel and/or confirm the food order (e.g., within a limited period of time) within the native food ordering application. Therefore, in this implementation, a customer can submit a complete food order with as little as two inputs into a mobile computing device.

In a similar implementation, first method S100 generates a set of icons, each icon in the set of icons associated with a food item, a customization option for the food item, a payment method, and a store location, any of which components may be unique or common within the set of icons. For example, first method S100 can generate a first icon that specifies a latte with 2% milk and chocolate sprinkles to be paid for with a particular credit card and fulfilled by a particular local coffee shop, and first method S100 can generate a second icon that specifies a double-shot espresso to be paid for with the particular credit card and fulfilled by the particular local coffee shop. In this implementation, once a customer selects a native food ordering application from a home screen on a mobile computing device, the native food ordering application opens and first method S100 displays the set of icons within a home screen of the native food ordering application. When the customer selects a particular icon from the set of icons displayed within the native food ordering application, first method S100 can automatically send a particular food order associated with the particular icon to a particular associated store location. Furthermore, in response to selection of the particular icon, first method S100 can display a second screen through which the customer can cancel and/or confirm the particular food order. Therefore, in this implementation, a customer can submit a complete food order with as little as a first input for a general order application and a second input to select a particular food order from a limited set of favorite food orders.

As in the foregoing implementation, first method S100 can enable a customer to quickly submit a remote food order, such as through a "single click" or "two-click" interaction with an order icon displayed within a native (e.g., software program) application on a mobile computing device. Alternatively, first method S100 can enable a customer to quickly submit a remote food order using a voice command, such as by implementing speech interpretation software within a native application executing on a mobile computing device. Furthermore, first method S100 can enable a customer to selectively time submission of his remote food order in advance of his arrival at a particular store location such that his travel to the store location may occur substantially simultaneously with preparation of his food order. In other words, first method S100 can enable a customer to time his remote food order such that his food order is prepared and ready for pickup by the time the customer arrives at the store location, which can substantially reduce and/or eliminate an in-store wait time that the customer would otherwise endure following in-person submission of his food order.

First method S100 can be hosted by a single food vendor (e.g., restaurant) chain, such as a national, regional, statewide, or city-specific coffee shop franchise or fast food franchise. For example, first method S100 can assign a particular coffee shop, from a set of coffee shops under a single franchise, to the icon representing a custom coffee order. First method S100 can additionally or alternatively support multiple brands or franchises, such as multiple independent coffee shops, regional-franchise coffee shops, and/or national franchise coffee shops in one area or city. For example, first method S100 can generate an icon representative of a custom coffee order entered by a customer, and first method S100 can assign the customer coffee order to a particular local coffee shop, from a set of regional coffee shops under various franchises, to fulfill the custom coffee order for the customer.

As described above, first method S100 can be implemented as a native application executing on a mobile computing device, such as on a smartphone or a tablet. First method S100 can be similarly implemented within a web browser executing on a mobile or a static computing device, such as on a smartphone, a laptop computer, or a desktop computer. Additionally or alternatively, first method S100 can be implemented by a computer system, such as a food ordering service that handles food pre-orders from customers and submits food pre-orders to various local food vendors to enable remote ordering of favorite customized food items. The computer system can be a cloud-based computer (e.g., Amazon EC3), a mainframe computer system, a grid-computer system, or any other suitable computer system. The computer system can support a food order submission platform for building icons representative of custom food orders and for communicating pre-orders to applicable local food vendors. For example, the computer system can receive a food order from a customer and submit the food order to a particular food vendor over a distributed network, such as over the Internet, wherein one or more processors within the distributed network implement various Blocks of first method S100.

First method S100 is described herein as applicable to the food service industry, such as to enable a customer to pre-order a favorite customized food item as the customer travels to a food establishment such that the food establishment may deliver the pre-ordered items to the customer promptly after the customer arrives at the food establishment. For example, first method S100 can enable a customer to remotely order a beverage, such as a hot or cold coffee-based beverage. First method S100 can also enable a customer to save and order multiple items in a custom food order, such as a beverage and a snack from a coffee shop or a beverage, a sandwich, and a cookie from a café. However, first method S100 can be applicable to other customer service fields. For example, first method S100 can enable a customer to pre-order hardware items as the customer travels to a home improvement business such that the pre-ordered hardware is paid for and ready for pickup by the customer upon his arrival to the home improvement business. In another example, first method S100 can enable a customer to pre-order a physical book items as the customer travels to a bookstore such that the pre-ordered book is paid for and ready for pickup by the customer upon his arrival to the bookstore.

Figure 2:
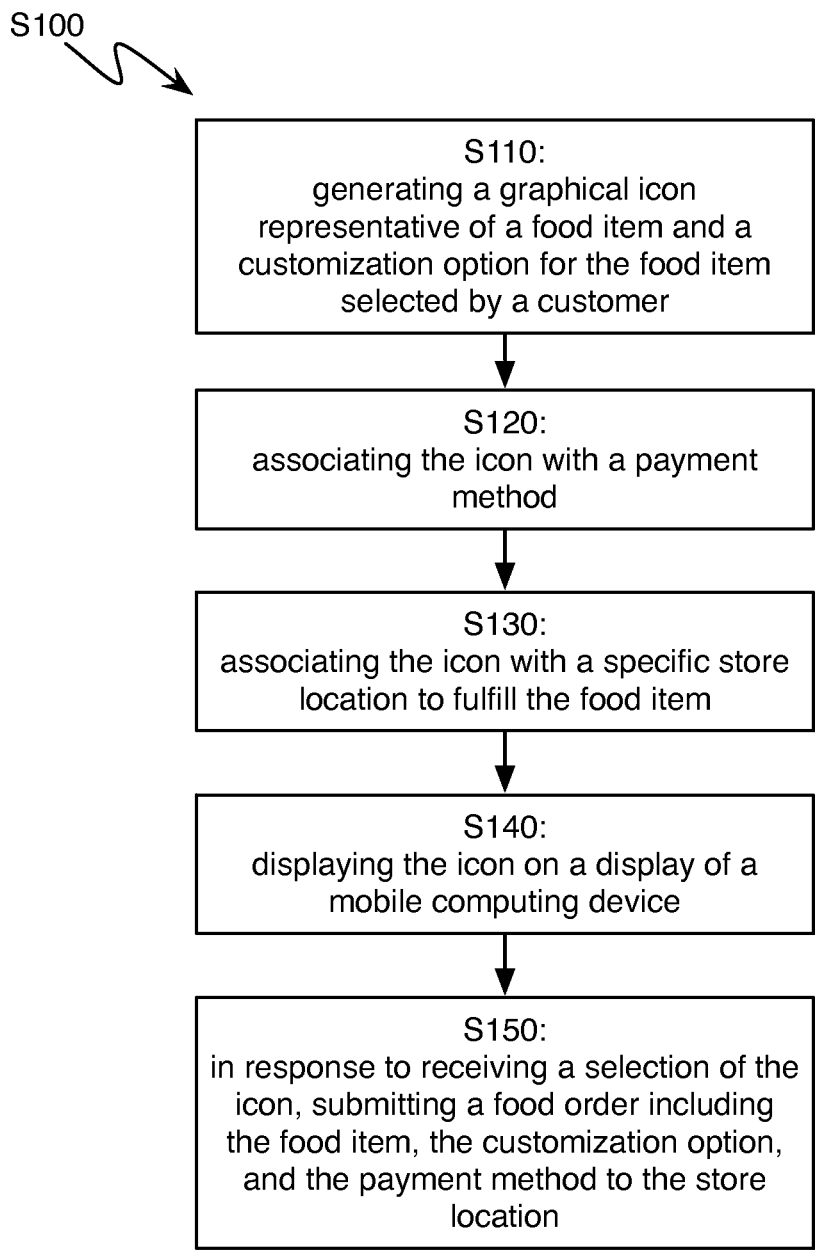
FIG. 2 is a flowchart representation of a variation of the first method.

As shown in FIG. 2, Block S110 of first method S100 recites generating a graphical icon representative of a food item and a customization option for the food item selected by a customer. Generally, Block S110 functions to generate a visualization (e.g., a graphical icon) representative of a common or 'favorite' food order such that the customer can visually discern and select the icon to submit the represented food order with payment to a particular food vendor, such as with a single or as few as two inputs or 'clicks.'

Block S110 can apply any number of filters, modifications, and/or details to the icon to represent modification (i.e., customization) of a food entered by the customer. In one implementation, Block S110 selects a stock image representative of the food item and a stock overlay representative of the customization option and superimposes the stock overlay over the stock image. For example, Block S110 can prompt the customer to select a favorite coffee drink, to select a favorite size of the coffee drink, and to select a favorite milk option for the coffee drink. In this example, Block S110 can subsequently select a stock image representative of the favorite coffee drink in the favorite size, select a stock overlay representative of the favorite milk option, and combine the stock image and the overlay to generate the order icon. In a similar implementation, Block S110 groups multiple discrete icons into the single order icon, wherein each discrete icon represent a particular aspect of a food item. For example, Block S110 can generate the order icon for a custom coffee beverage by selecting a cup icon for a coffee beverage of a particular size, color filtering the cup icon according to a type of coffee beverage (e.g., black for espresso, dark brown for drip coffee, and medium brown for cappuccino, and light brown for latte), and selecting and applying a flavoring icon over the cup icon (e.g., a vanilla bean icon for vanilla syrup, an almond icon for almond milk, and a whipped crème icon for whipped crème topping).

The order icon can additionally or alternatively include text for clarification. For example, Block S110 can select relevant text from a menu item select by the customer to create the custom food order. Alternatively, Block S110 can prompt the customer to enter a description for the food item and arrange text including the description adjacent a graphical image in the icon. Block S110 can also implement a table or descriptor rules to automatically generate a description or short textual phrase for the food item. In one example, Block S110 groups a graphical representation of a medium cup with text reading "medium latte," a graphical representation of a vanilla bean, and a graphical representation of blocks of ice to indicate a medium iced vanilla latte. In another example, Block S110 receives customer entry of the text descriptor "Peter's afternoon pick-me-up" and assigns the text descriptor to the icon.

Block S110 can collect details for the 'favorite' or custom food order from the customer through a native application executing on a mobile computing device, through a web browser, through an electronic kiosk at store location, and/or in person at a store location, etc. In one implementation, Block S110 retrieves details of a previous food order submitted with payment to a local store location through a native application executing on the mobile computing device and generates the icon accordingly. In this implementation, Block S110 can display multiple previous orders within the user interface, enable the customer to select a particular previous food order, and extract relevant information from the particular previous food order to generate the icon. Block S110 can further enable the customer to modify details extracted from the previous food to generate the icon, such as by enabling the customer to enter alternative payment information or to select an alternative store to fulfill the food order. Block S110 can therefore retrieve order details from a previous food order, including a menu item, a customization option, a store location, and a payment method, and apply the order details to generate the icon.

In another implementation, Block S110 prompts the customer to enter relevant order information through a user interface, such as a user interface within a native application executing on the mobile computing device. In this implementation, Block S110 can prompt the customer to log into a member account with login information and, after receiving the login information and validating the login information, collect order information through various input regions. For example, Block S110 can determine the customer's location (e.g., through a GPS sensor arranged within the mobile computing device), identify various local stores (e.g., within a one mile of the customer), and prompt the user to select a particular location from the various local stores. Block S110 can thus retrieve a menu of items available at the particular store location, including customization options, and display the menu in list form within the user interface. Block S110 can prompt the customer to select one item from the menu and then to select customization options for the selected menu item through subsequent menu pages within the user interface. Block S110 can further cooperate with Block S120 and Block S130 to implement the customer's member account login information to access a member database containing customer-related information, such as personal information, favorite store locations, favorite food items, and/or preferred payment methods. Blocks S110, S120, and/or S130 can implement this information by auto-filling various input regions on the menu pages within the user interface, by ordering displayed menu items, and/or by ordering customization items according to a perceived customer preference. Blocks S110, S120, and/or S130 can therefore prompt manual entry and/or selection of one or more details to apply to the order icon and/or to the food order represented by the order icon. Block S110 can therefore cooperate with Block S120 and Block S130 to retrieve relevant order information from the customer through the same user interface.

As shown in FIG. 2, Block S130 of first method S100 recites associating the icon with a store location to fulfill the food item. Generally, Block S130 functions to specify a particular store location to fulfill the food order and to assign the particular store to the icon such that, when the customer selects the icon, Block S150 can submit the food order to the particular store for fulfillment.

In one implementation, Block S110, Block S120, and Block S130 cooperate to display and collect customer information through the user interface executing on the mobile computing device. For example, Block S130 can display at least one local store location, Block S110 can display a menu of food item options available from the store location, and Block S120 can display one or more payment methods accepted by the store location. In this example, Blocks S110, S120, and/or S130 can receive customer selection of a store location, a food item option, and/or payment method through a tap, a click, a gesture, and/or a textual input, etc. on a touch display of the mobile computing device.

Blocks S110 and S130 can also display multiple menu items and multiple store locations substantially simultaneously through the user interface such that selection (or de-selection) of a menu item can affect which store locations are displayed, such as if not all store location provide the same or comprehensive menu items. Similarly, Blocks S110 and S130 can display multiple menu items and multiple store locations substantially simultaneously through the user interface such that selection of a store location can affect which menu items are displayed.

As described above, Block S110 can display various store locations within the user interface (e.g., on a screen of the mobile computing device). The store locations can be associated with the same company or brand (e.g., franchise), and/or the store locations can be discrete or independent store locations, as described above. In one implementation, Block S130 displays a set of store locations proximal a location of the customer. For example, Block S130 can poll a Global Positioning System sensor within the mobile computing device to determine the location of the customer and then select a set of store locations within a particular range of the customer, such as within six blocks if the customer is walking, within one mile if the customer is driving in an urban area, or within five miles if the customer is driving within a suburban or residential area. Alternatively, Block S130 can prompt the customer to enter a zip code, city name, address, a saved location, or any other location. Alternatively, Block S130 can display a preselected group of saved store locations designated as favorite locations of the customer, such as based on previous food orders submitted by the customer. Block S130 can additionally or alternatively filter store location displayed for the customer based on store locations that offer a particular food item and/or food item option, such as a favorite food item selected by the user or a perceived favorite food item option based on previous customer food orders. For example, after receiving a customer selection of a food item option only offered by store locations A, B, and C, Block S130 can display store locations A, B, and C but omit displaying store location D because location D does not offer the selected food item option.

Block S130 can display the store locations on a map within the user interface. For example, Block S130 can display the store locations on the map with selectable graphical images, selectable photos of each respective store location, or any other suitable selectable icon. The map can include "zoom" functionality for providing more or less detailed views of the store locations (e.g., relative to the customer's location). As shown in FIG. 1, Block S130 can display the store locations in a text-based list, such as organized by approximate region or proximity to the customer. For example, Block S130 can display the store locations in tiered drop-down menus (e.g., "Northern California">"San Francisco") or any other suitably organized list.

Alternatively, Block S130 can automatically select the store location. For example, Block S130 can select a nearest store location that can fulfill the customer's food order (e.g., based on the GPS location of the customer's mobile computing device). Additionally or alternatively, Block S130 can select a store location with a minimal wait time to receive the completed food order, such as based on a current order queue at the store location in comparison to current order queues at other local store locations. However, Block S130 can function in any other way to identify, determine, select, and/or receive a selection for a particular store location to fulfill the customer's food order.

Once Block S130 identifies, determines, selects, and/or receives a selection for a particular store location, Block S130 can link the food order to the particular store location such that Block 150 can submit the food order to the particular store location for fulfillment. However, Block S130 can assign or associate a store location with the food order in any other suitable way.

Figure 4A:
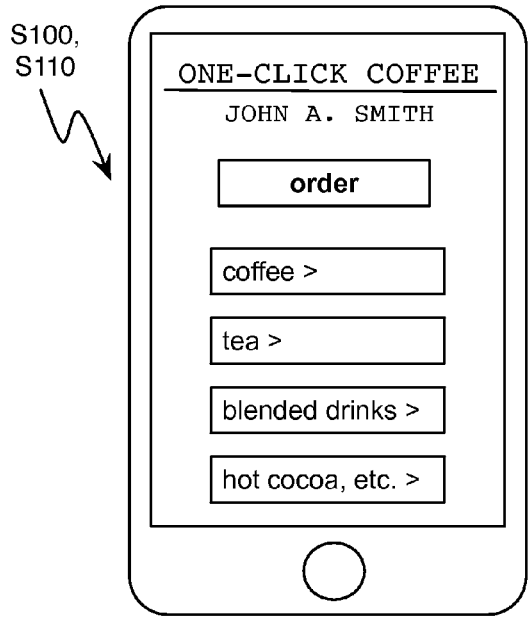
FIGS. 4A-4F are graphical representations of variations of the first method.
Figure 4B:
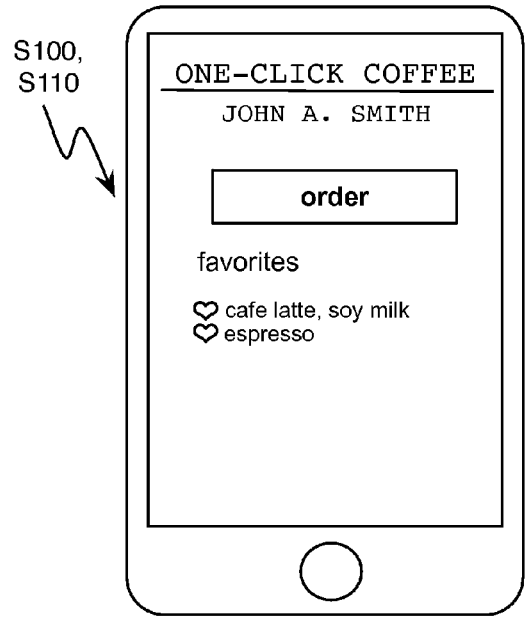
Figure 4C:
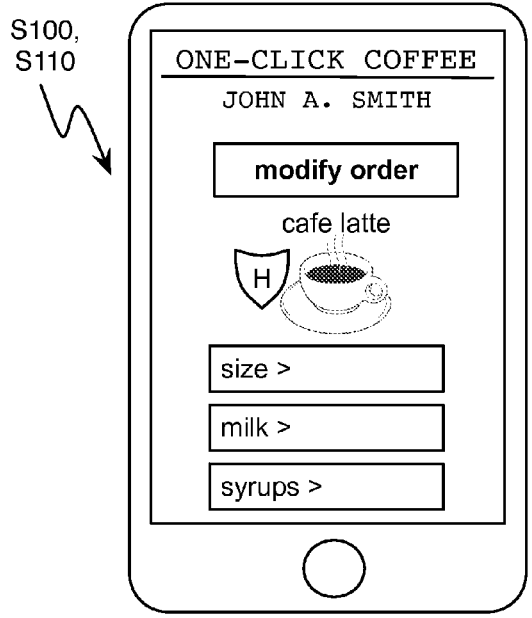

Once the customer selects a store location in Block S130, Block S110 can display a menu of food items available through the selected store location. For example and as shown in FIG. 4A, Block S110 can organize and display the menu of food items by type (e.g., coffees, teas, blended drinks). In this example, Block S110 can further display or link each menu item to a description and/or a customer review. Block S110 can also enable the customer to customize a food order, as described above. For example, once the customer selects a food item from the menu, Block S110 can further prompt the customer to select one or more food item customization options if applicable, such as drink size (e.g., small, medium, large), topping (e.g., whipped crème, sprinkles), milk type (e.g., whole milk, soy milk, almond milk), or a special instruction.

As shown in FIG. 2, Block S120 of first method S100 recites associating the icon with a payment method. Generally, Block S120 functions to specify a particular payment method to apply to a transaction with the local store for fulfill of the food order and to assign the payment method to the icon such that, when the customer selects the icon, Block S150 can submit the food order to the store with applicable payment information.

Figure 4D:
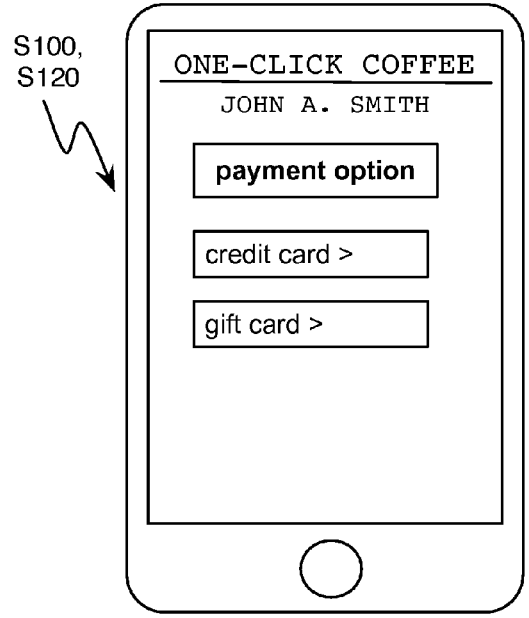

As shown in FIGS. 1 and 4D, Block S120 can display one or more payment methods within the user interface and can enable the customer to select a particular payment method by which to pay for the food order. For example, Block S120 can display, within the user interface, a representative icon and the last four digits of a credit card, a debit card, and a gift card and subsequently prompt the customer to select one of the three payment methods to apply to the food order. As in this example, Block S120 can also interface with a store location selected by the customer to identify payment methods accepted by the store location, and Block S120 can thus display only payment methods accepted by the store location.

Block S110 can display one or more payment methods previously submitted by the customer in one or more previous transactions and stored on the mobile computing device. Block S110 can also retrieve multiple payment methods previously used by the customer and can display the payment methods in a text-based list (e.g. with radio buttons or checkboxes) and/or with representative graphical icons.

Alternatively, Block S120 can prompt the customer to select a payment method type and to enter payment method information for the selected payment type. For example, after receiving a payment method selection, Block S120 can request necessary payment information (e.g., a credit card number) and encrypt sensitive information for storage and/or transmittal.

Once Block S120 receives a selection for a particular payment method, Block S120 can set the selected payment method as a default payment method and can store the payment method in the member database as associated with the customer. By storing the payment method, Block S120 can thus avoid a future need to collect the same payment information from the customer prior to submission of a future food order (e.g., from the selected store location).

Once Block S120 identifies, determines, selects, and/or receives a selection for a particular payment method, Block S120 can link the food order to the particular payment method such that Block 150 can submit the food order to the store location with suitable payment. However, Block S120 can assign or associate a payment method with the food order in any other suitable way.

As described above, Block S110 can further generate and/or modify the order icon according to the payment method selected in Block S120 and/or according to the store location selected in Block S130. However, Block S110, Block S120, and Block S130 can function in any other way to receive and implement order information in the form of an order icon for the food order.

Once Block S110 generates the order icon and Blocks S120 and S130 associate a payment method and a store location with the order icon, first method S100 can save the order icon and associated data for subsequent use. For example, by saving the order icon, first method S100 can enable the customer to submit duplicate food orders over time (e.g., daily, weekly, or on occasion) with a minimal number of inputs (e.g., a single click or two inputs). Therefore, first method S100 can enable the customer to quickly access and select at least one previously selected store location, food item option, and/or payment method through selection of the order icon. For subsequent orders, First method S100 can store and subsequently display data specified in the order icon as a reselectable combined order (e.g., "Most recent orders") that can be easily and quickly submitted again through selection of the order icon. Alternatively, First method S100 can store and subsequently display data specified in the order icon individually as reselectable order components or favorites, (e.g., "Most recent store location", "Favorite beverage orders", or "Most recent payment method") that the customer can later select to build a subsequent food order. First method S100 can also assign various selected data items as default selections for the customer. First method S100 can also enable the customer to 'mix and match' various order components in previous food orders to create a new food order. For example, if the customer is traveling in a new city but near a store location associated with a previously-selected store location (e.g., under the same franchise), Block S130 can enable the customer to select a new (never before selected) store location, Block S110 can enable the customer to select a "favorite" beverage order, Block S120 can select a default payment method, and block S150 can remotely transmit the food order to the new local store location.

As shown in FIG. 2, Block S140 of first method S100 recites displaying the icon on a display of a mobile computing device. Generally, Block S140 functions to display the order icon such that the customer can select the order icon with a single or limited number of inputs to submit the food order, with payment, to the store location. In one implementation described above, Block S140 displays the order icon on a home screen on the mobile computing device, such as in the form of an icon for a native application. In this implementation, the customer can simply select the icon for the native application to submit the food order. In another implementation, Block S140 displays the order icon within a default page within a native application executing on the mobile computing device, such as a primary (e.g., oversized) icon within a home page of the native application. In this implementation, the customer can select an icon for the native application and then select the order icon within the native application to submit the food order. In a similar implementation, Block S140 displays the order icon in a set of order icons (e.g., four total order icons) within a default page within a native application executing on the mobile computing device. In this implementation, the customer can again select an icon for the native application and then select the order icon within the native application to submit the food order. Block S140 can therefore enable the customer to quickly confirm and submit the food order through a single gesture (e.g., click, tap, swipe) or through two gestures (e.g., a first to open the native application and a second to select the order icon).

Figure 4E:
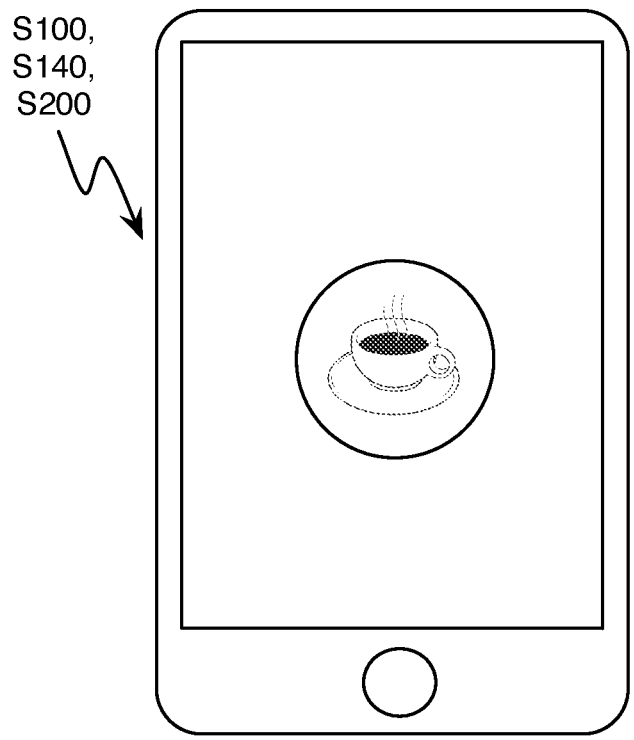

As shown in FIGS. 1 and 4E, Block S140 can display the order icon that defines an input region such that the customer can select the order icon to submit the food order. Alternatively, Block S140 can display the order icon and an adjacent order submission icon defining an input region, wherein the customer can select the order submission icon to submit the food order associated with the order icon. Once the customer selects the order icon and/or the order submission icon, Block S140 can also direct the customer to an order confirmation page, such as a menu within the user interface that includes an order confirmation icon, wherein the customer can select the order confirmation icon to confirm the food order. For example, Block S150 can withhold submission of the food order until the customer selects the order confirmation icon or withdraw a recently-submitted food order if the customer fails to select the order confirmation icon within a specified period of time following selection of the order icon and/or the order submission icon.

Block S140 can display the order icon and/or the order submission icon as any suitable large button or link indicating that selection of the icon will submit the order. For example, Block S140 can display the order submission icon that includes a button labeled "submit", "go", or "order." The button can also be any suitable color and/or shape. However, Block S140 can display the order icon and/or the order submission icon in any other way and in any other format.

Once the customer selects the order icon and/or the order submission icon, first method S100 can further prompt the customer to enter a preferred pickup time (e.g., in 10 minutes), such as based on when the customer expects to arrive at the selected store location to pick up his order. As described below, first method S100 can implement the customer's preferred pickup time to adjust the position of the food order in a queue of food orders at the store location.

As shown in FIG. 2, Block S150 of first method S100 recites, in response to receiving a selection of the icon, submitting a food order including the food item, the customization option, and the payment method to the store location. Generally, Block S150 functions to transmit a remote food order including the selected food item and the selected payment method to the store location. For example, Block S150 can send the food order and payment information to a second computing device associated with or arranged within the store location, such as over a cellular network or over a computer network (e.g., the Internet) to computerized restaurant ordering system or point-of-sale system. In one implementation, Block S150 transmits the remote food order in response to selection of the order submission icon displayed in Block S140. For example, Block S150 can receive a command to launch a native application through selection of the order icon displayed on a home screen of the mobile computing device and thereby trigger transmission of the remote food order to the store location, as described above. In another implementation, Block S150 submits the food order to the store location in response to a verbal command identified through speech recognition software executing on the mobile computing device. For example, Block S150 can receive verbal confirmation to submit the food order through speech recognition software interfacing with the native application.

Block S150 can therefore remotely communicate order information to the store location and signal the selected store location to enter the food order in a food preparation queue. The store location can subsequently handle the remote order as if the food order were received in person. As described above, the customer can thus time submission of his remote order submission in advance of arrival at the store location such that, when the customer arrives at the store location, the order is ready for pickup or at least queued and/or in preparation. The customer can therefore submit a food order through first method S100 prior to arrival at the store location, thereby reducing in-store wait time compared to in-person ordering.

Figure 4F:
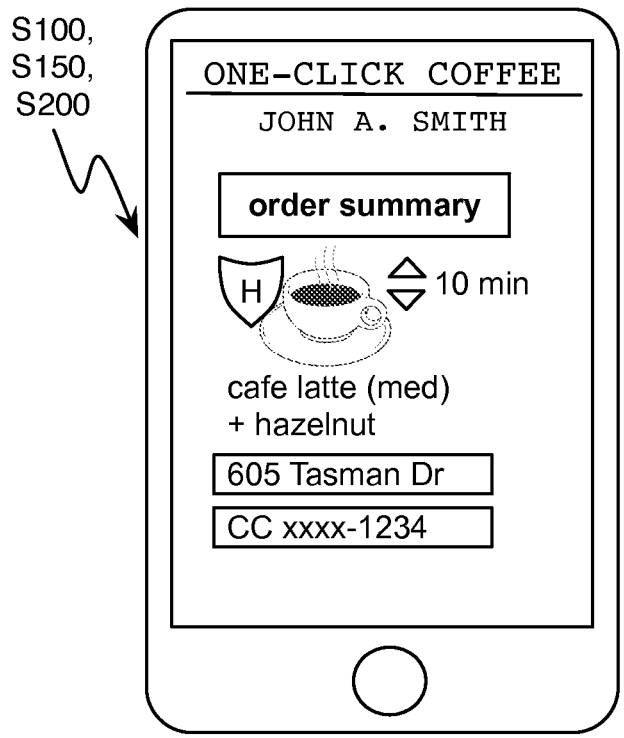

As shown in FIG. 4F, once the food order is submitted to the store location, Block S150 can also display a receipt of the food order for the customer, such as on the display of the mobile computing device. For example, the receipt can specify the food item, the customization option, the payment method, and the store location. Alternatively, Block S150 can email the receipt to the customer, message the receipt to the customer (e.g., via SMS text message), or communicate the receipt for the food order to the customer or to a customer account in any other suitable way. However, Block S150 can handle food order submission and receipt transmission in any other suitable way.

Figure 3:
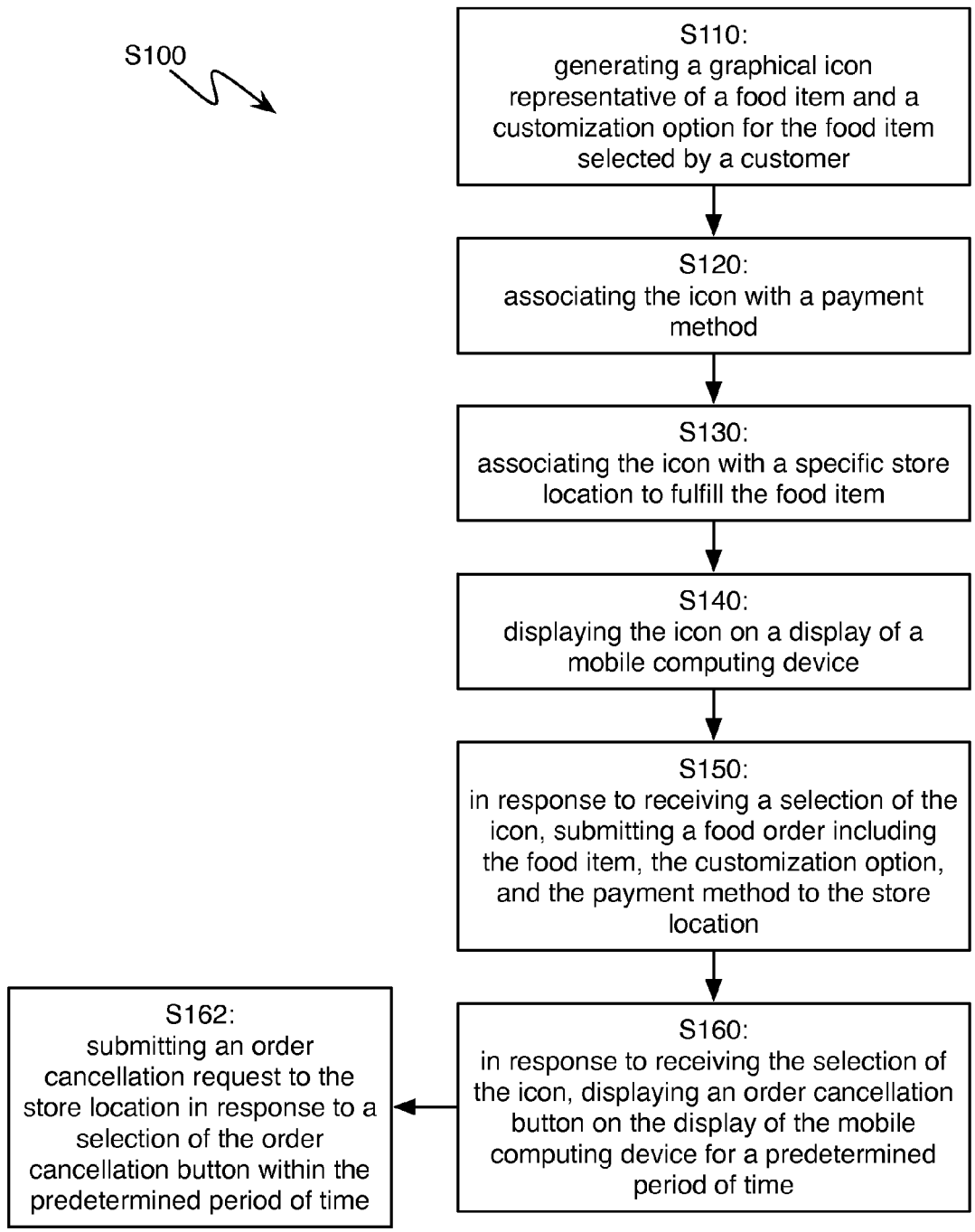
FIG. 3 is a flowchart representation of a variation of the first method.

As shown in FIG. 3, one variation of first method S100 further includes Block S160, which recites, in response to receiving the selection of the icon, displaying an order cancellation button on the display of the mobile computing device for a predetermined period of time. In this variation, first method S100 can further include Block S162, which recites submitting an order cancellation request to the store location in response to a selection of the order cancellation button within the predetermined period of time. Generally, Blocks S160 and S162 function to enable the customer to cancel the food order, such as in the event of incidental or inadvertent selection of the order icon.

In one implementation described above, Block S140 displays the order icon on a home screen on the mobile computing device, such as in the form of an icon for a native application. In this implementation, once the customer selects the icon for the native application, Block S160 can display the order cancellation button, and Block S150 can submit the food order if the customer does not select the order cancellation button within a threshold period of time, such as thirty seconds. In another implementation, Block S140 displays the order icon within a default page within a native application executing on the mobile computing device. In this implementation, the customer can select an icon for the native application, and once the customer selects the order icon within the native application, Block S150 can submit the food order to the store location. Subsequently, Block S160 can display the order cancellation button for a specified period of time (e.g., one minute), and Block S162 can submit an order cancellation request to the store location in response to a selection of the order cancellation button. In the foregoing implementation, Block S160 can display the order cancellation button for the specified period of time that is dependent on an anticipated time between transmission of the food order to the store location and an anticipated preparation start time of the food order. For example, Block S160 can interface with a point-of-sale system within the store location to access a current queue of food orders and display the order cancellation button until the store location begins the food order or until the store location begins the food order less some safety window, such as thirty seconds.

Block S160 can therefore display the order cancellation button for a "bailout" period. Once the bailout period has expired, Block S160 can further display a notification that the order can no longer be cancelled, such as, "Sorry, cannot cancel order."

Blocks S160 and S162 can additionally or alternatively enable the customer to modify food order (e.g., select a different food item or an alternative food item customization option), select an alternative payment method, and/or select an alternative store location to fulfill the food order. For example, Block S160 can display food item, customization, payment, and store location options within the user interface of the native application after the customer submits the food order, and Block S162 can transmit modifications to the food order to the selected store location prior to initial preparation of the food order or before an alternative customization option has been implemented during preparation of the food order. However, Blocks S160 and S162 can handle order cancellations and/or post-submission order modifications in any other suitable way.

First method S100 can further include alerting the customer of targeted offers. Generally, first method S100 can alert the customer of targeted offers by displaying, on the mobile computing device, a textual and/or graphical display corresponding to a targeted offer. In one example, first method S100 can display a targeted offer including a suggested or advertised item sold by the selected store location, such as a freshly baked cookie available at the selected store location. In another example, first method S100 can display a targeted offer including a discount or coupon deal related to the selected store location and/the food item. However, first method S100 can display any other targeted offer including any other suitable advertisement or offer. First method S100 can further enable the customer to add an additional item to his food order, such as by displaying an offer purchase icon (e.g., an "add to order" button) corresponding to the targeted offer prior to or after Block S150 transmits the food order to the store location. However, first method S100 can handle targeted offers in any other suitable way.

First method S100 can additionally or alternatively generate a social networking notification in response to transmission of the food order to the store location in Block S150. First method S100 can therefore enable the customer to share his order and/or location with others through a social networking system. For example, first method S100 can include pre-populating a message or enabling a customer to create a customized message and publishing the message to an authorized user account with the social networking system. For example, first method S100 can generate the pre-populated message that includes, "Getting a coffee at [store name and/or location]." First method S100 can also insert a customer-entered description of the food order or order icon, as described above, to generate the message. For example, first method S100 can generate first method S100 that includes "Picking up a Schox Special at [store name and/or location]," wherein Block S110 received customer entry of "Schox Special" during assembly of the order icon. However, first method S100 can handle social networking system notification and/or messages in any other suitable way.

2. Second Method

Figure 5:
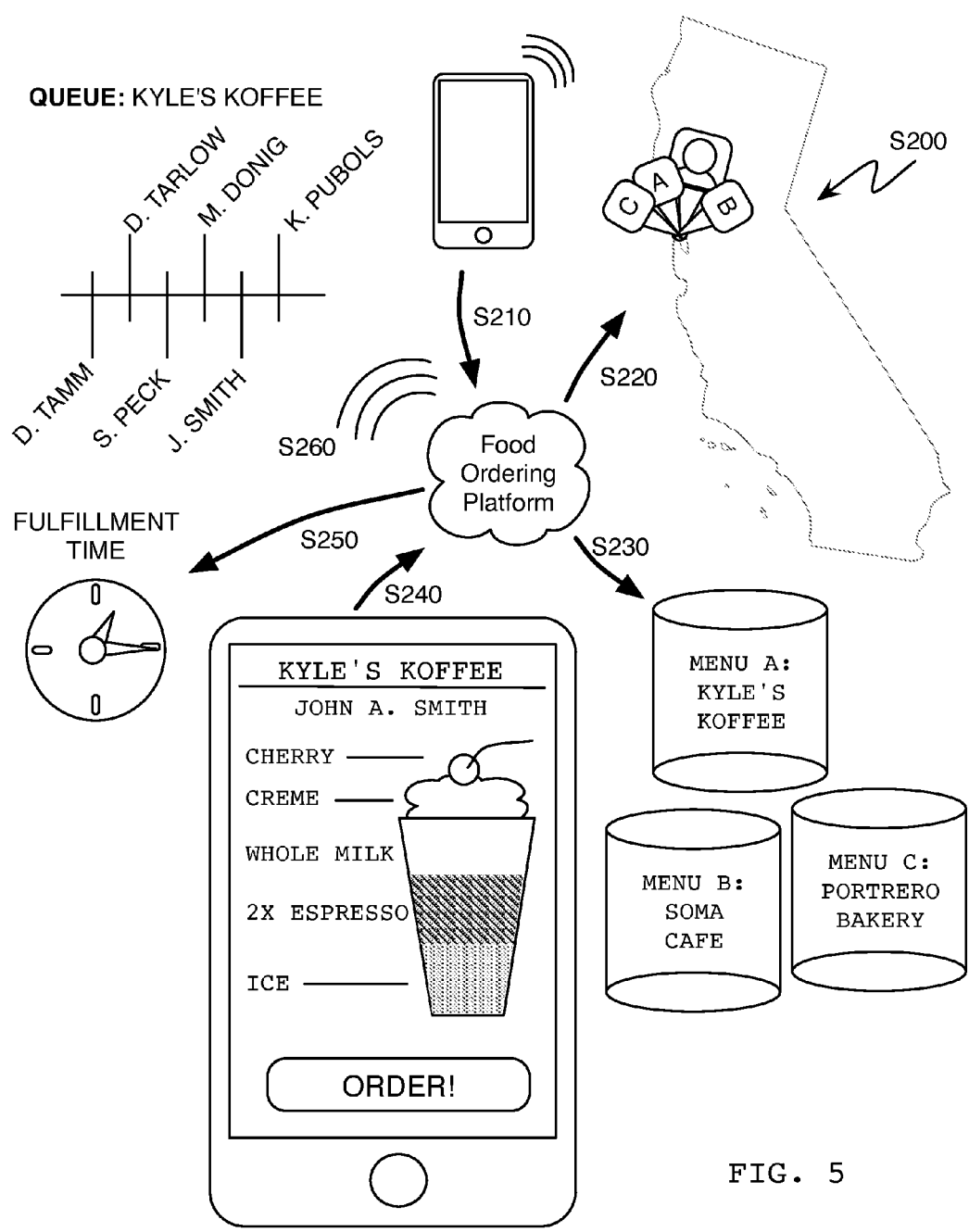
FIG. 5 is a flowchart representation of a second method.

As shown in FIG. 5, second method S200 for submitting a food order remotely includes: retrieving a location of a customer through a mobile computing device in Block S210; identifying a store location within a threshold range of the location of the customer in Block S220; selecting a limited menu of food items fulfilled by the store location in Block S230; receiving the food order from the customer through a user interface on the mobile computing device in Block S240, the food order specifying a food item from the limited menu of food items; respective of a food type of the food item, estimating a fulfillment time for the food order in Block S250; and respective of an anticipated customer pickup time and the fulfillment time for the food order, inserting the food order between two previous food orders in an order queue for the store location in Block S260.

Figure 8:
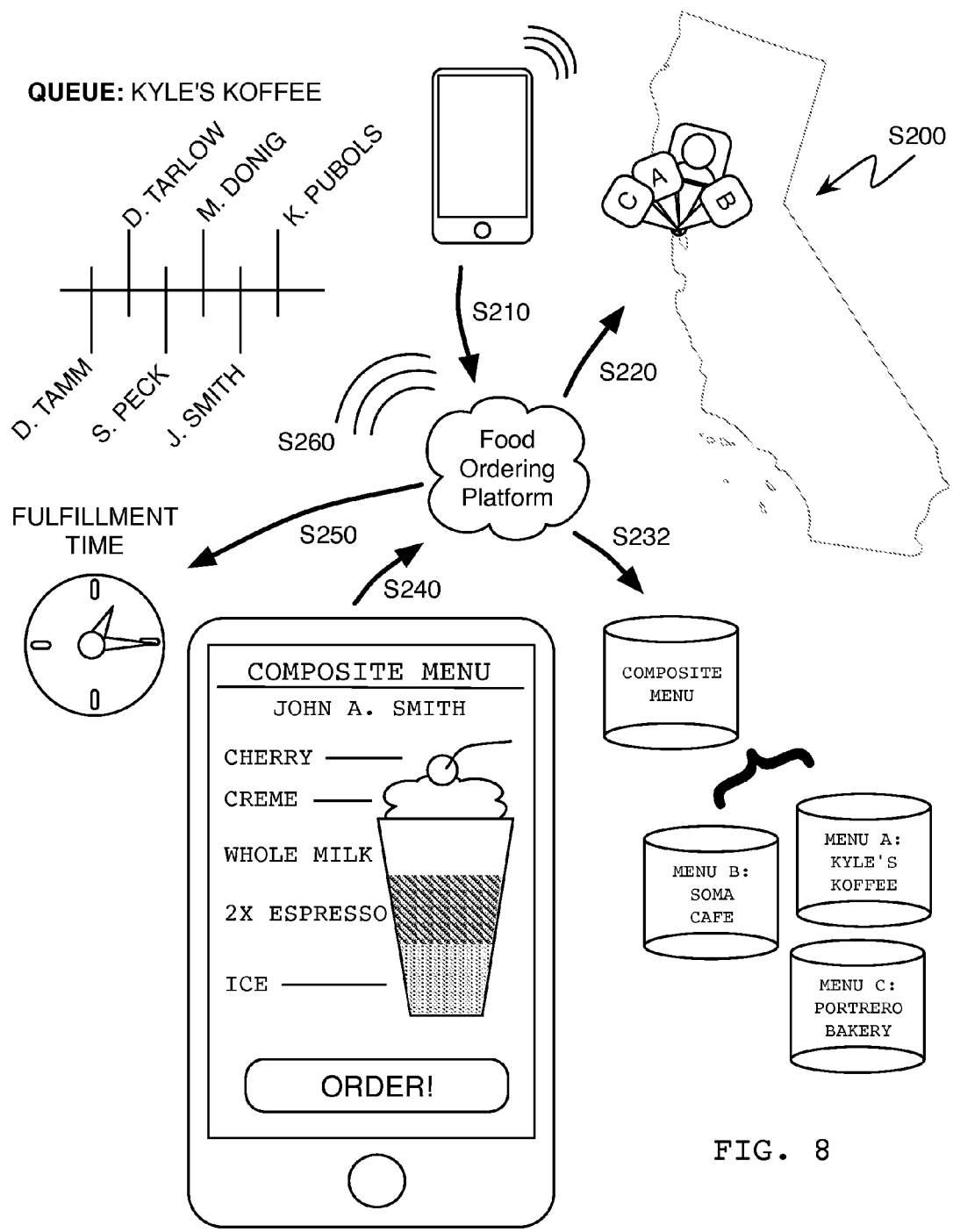
FIG. 8 is a flowchart representation of a variation of the second method.

As shown in FIG. 8, one variation of second method S200 for submitting a food order remotely includes: retrieving a location of a customer through a mobile computing device in Block S210; selecting a set of store locations proximal the location of the customer in Block S220; generating a composite menu of food items including a limited menu of food items fulfilled by each store location in the set of store locations in Block S232; receiving a selection for a food item in the composite menu of food items through a user interface on the mobile computing device in Block S240, the food item fulfilled by a particular store location in the set of store locations; respective of a food type of the food item, estimating a fulfillment time for a food order specifying the food item in Block S250; and respective of an anticipated customer pickup time and the fulfillment time for the food order, inserting the food order in an order queue for the particular store location in Block S260.

Generally, second method S200 can enable a customer to assemble and submit a food order to a food supplier prior to arriving at the food supplier's location, and second method S200 can queue the customer's food order according to an anticipated time of arrival of the customer to the food supplier. The food supplier (i.e., the store location) can be a restaurant, a café, a bakery, a coffee shop, a food truck, or any other suitable establishment that serves and/or delivers food and/or drink. The food order can include one or more standard or customized food items and/or drink items, such as from a standard, time-dependent, or 'secret' (e.g., unpublished) menu, condiments, napkins and/or utensils, a pickup, eat-in, or delivery method, etc. For example, the food order can specify a muffin and a latte, including size, number of espresso shots, milk type, and amount of whipped cream topping. Second method S200 can queue the food order such that all items in the queue are ready for pickup within a threshold period of time (e.g., thirty seconds) of the customer's anticipated arrival to a café, such that the food order is delivered to the customer within a threshold period of time (e.g., one minute) after the customer is seated within a restaurant, or such that the food order is delivered to the customer's home within a threshold period of time (e.g., five minutes) after arriving at home.

The variation of second method S200 can similarly enable the customer to assembly a food order for one or more food items prior to selection of a store location to fulfill the food order. For example, a customer can access a composite menu of food items including all or a subset of menu items available from multiple local food vendors, and, as the customer selects subsequent items to add to the order, unique menu items offered by food vendors that cannot fulfill previously-selected food items are removed from the composite list to substantially ensure that a single vendor can fulfill the compete food order. Once the food order is completed, second method S200 can select a particular local vendor to fulfill the order, such as based on current wait time and/or proximity of the customer to the food vendor.

Second method S200 can be hosted by a single restaurant (or food vendor) chain, such as a national, regional, statewide, or city-specific coffee shop franchise or fast food franchise. For example, second method S200 can select a particular coffee shop, from a set of coffee shops under a single franchise, to fulfill a custom coffee order for a customer with minimal wait between submission of a pre-order and delivery of items in the pre-order to the customer. Second method S200 can additionally or alternatively support multiple brands or franchises, such as multiple independent coffee shops, regional-franchise coffee shops, and/or national franchise coffee shops in one area or city. For example, second method S200 can receive a custom coffee order from a customer and subsequently select a particular coffee shop, from a set of coffee shops under various franchises, to fulfill the custom coffee order for the customer with minimal wait between submission of a coffee-shop agnostic pre-order and delivery of the custom coffee order to the customer.

Second method S200 can be implemented by a computer system, such as a food ordering service that handles food pre-orders from customers and queues food pre-orders to applicable local restaurants to enable timely fulfillment of pre-orders according to the location and/or estimated times of arrival of the customers. The computer system can be a cloud-based computer (e.g., Amazon EC3), a mainframe computer system, a grid-computer system, or any other suitable computer system. The computer system can support a pre-order generation and submission platform for building food orders for unique customers and communicating the pre-orders to applicable local food vendors. For example, the computer system can receive food orders from customers and submit the food orders to various food vendors via a distributed network, such as over the Internet, wherein one or more processors throughout the distributed network implement one or more Blocks of second method S200.

The computer system can also incorporate or interface with a customer-side user interface (shown in FIGS. 5 and 8) and a vendor-side interface. The customer-side user interface can execute on a mobile computing device of a customer to track customer location, display available menu items, direct the customer to a particular vendor (i.e., store) location, to collect payment form the customer, to display order status, and/or to receive order modifications, etc. The customer may therefore access the customer-side user interface to generate, submit, modify, and/or pay for a food pre-order. The vendor-side interface can execute on an electronic device arranged within the vendor, such as a digital display within a food preparation area (e.g., a kitchen), wherein employees of the vendor can (visually) access the vendor-side interface to manage a food order queue and to complete food orders. Generally, the customer-side user interface can execute within (e.g., be accessible through) a web browser or through a native application executing on a mobile computing device, such as a tablet, a smartphone, or a personal data assistant (PDA). The vendor-side interface can similarly execute within a web browser or through a native application executing on an electronic device, such as a laptop computer, a desktop computer, a tablet, a smartphone, a personal data assistant (PDA), etc.

Second method S200 is described herein as applicable to the food service industry, such as to enable a customer to pre-order food items as the customer travels to a food establishment and to enable the food establishment to deliver the pre-ordered items to the customer promptly after the customer arrives at the establishment. However, second method S200 can be applicable to other customer service fields. For example, second method S200 can enable a customer to pre-order hardware items as the customer travels to a home improvement business such that the pre-ordered hardware is paid for and ready for pickup by the customer upon his arrival to the home improvement business. In another example, second method S200 can enable a customer to pre-order a physical book items as the customer travels to a bookstore such that the pre-ordered book is paid for and ready for pickup by the customer upon his arrival to the bookstore.

Figure 6:
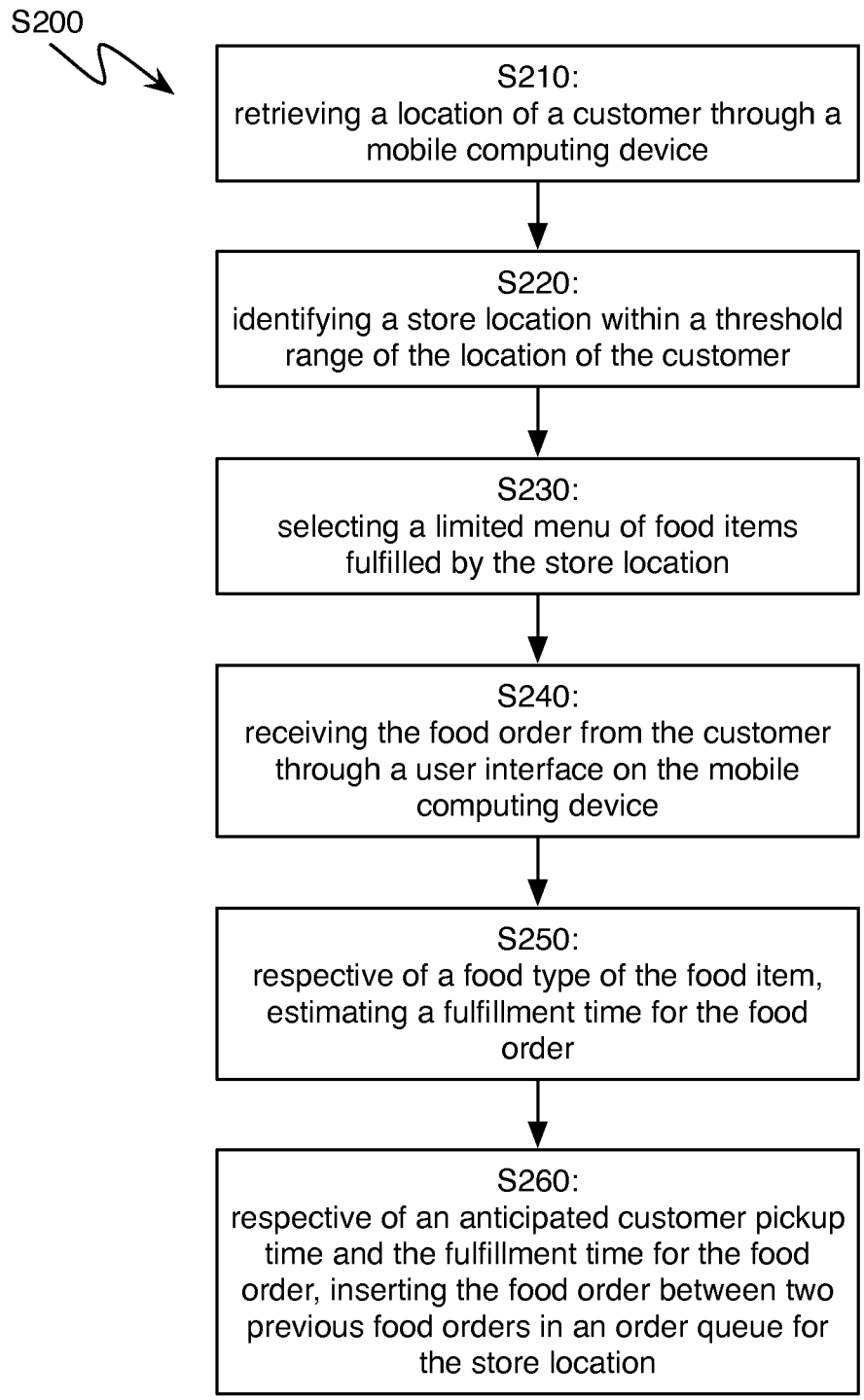
FIG. 6 is a flowchart representation of a variation of the second method.

As shown in FIG. 6, Block S210 of second method S200 recites retrieving a location of a customer through a mobile computing device. Generally, Block S210 functions to collect customer location information through a mobile computing device associated with the customer such that Block S220 can select a local store location for the customer and such that Block S260 can predict the customer's arrival at the store location to queue the customer's order.

In one implementation, Block S210 determines the location of the customer according to an output of a Global Positioning System sensor integrated into the mobile computing device. In one example, when the user opens a native application supporting the user interface on the mobile computing device, the mobile computing device can retrieve GPS location data through an integrated GPS sensor and transmit the GPS location data to a computer network (e.g., a remote server) implementing second method S200. In other implementations, Block S210 determines the location of the customer through cellular triangulation, signal strength from local registered Wi-Fi routers, or through manual entry by the customer. However, Block S210 can function in any other way to determine the location of the customer. Block S210 can also determine the customer's location in response to any other input or event.

As shown in FIG. 6, Block S220 of second method S200 recites identifying a store location within a threshold range of the location of the customer. Generally, Block S220 of second method S200 implements the customer location determined in Block S210 to select one or more store locations (i.e., food vendors) to fulfill a food order for the customer.

In one implementation, Block S220 applies the customer's GPS location to search a database of store locations within a threshold range of the current location customer. In this implementation, Block S220 can set the threshold range based on a current location of the customer, a speed or velocity of the customer, and/or a predicted or manually-entered customer destination. In one example implementation, Block S220 compares the customer's current location to previous locations of the customer, such as on a previous day at a similar time, to determine that the customer is within a common geographical area (e.g., at work or at home) and will likely remain within the geographical area. In this example implementation, Block S220 can set the threshold range that is a one-mile radius if the customer commonly walks near the common geographical location or if the customer is in an urban location, or Block S220 can set the threshold range that is a five-mile radius if the customer commonly drives or uses public transportation near the common geographical location or if the common geographical location is substantially rural or suburban. In another example implementation, Block S220 can compare the GPS location of the customer to a previous GPS location (e.g., from thirty seconds earlier) to estimate the speed and direction of the customer. In this example implementation, if Block S220 estimates that the customer moved fifteen meters in thirty seconds, Block S220 can determine that the customer is walking and thus set the threshold range at one mile. Alternatively, in this example implementation, if Block S220 estimates that the customer moved three hundred meters in thirty seconds, then Block S220 can determine that the customer is driving or using public transportation (e.g., by comparing GPS locations of known roads and/or public transportation routes) and thus set the threshold range at five miles. In yet another example implementation, Block S220 can predict the customer's destination based on stored customer data, such as previous destination locations on similar days (e.g., workdays) and/or at similar times (e.g., 2 pm), and set the threshold range based on the predicted destination. For example, Block S220 can determine a habitual customer destination to predict the customer's current destination. Alternatively, the native application can prompt the customer to provide his destination, such as by typing an address and selecting an area of a map displayed within the user interface on the mobile computing device. In this example implementation (and other example implementations), Block S220 can set the threshold range based on the time of day, the day of the week, proximity of the destination to other establishments (e.g., a rural, suburban, or urban area), etc. Block S220 can also select one or more store locations within a threshold range of a predicted path of customer from the customer's current location to the customer's entered or predicted destination. For example, Block S220 can set the threshold range to a maximum three block deviation from a quickest walking route between the customer's current location to the customer's entered or predicted destination.

Block S220 can automatically select a particular (i.e., single) store location near the customer, such from a set of store locations within the threshold range of the customer's current location, the customer's path, or the customer's destination. For example, Block S220 can identify a set of store locations within the threshold range of the location of the customer, access current order queues for the store locations in the set of store locations, such as through a server hosted by a restaurant chain, and then select a store location with a queue length that is less than a queue length of each other store location in the set of store locations. In this example, Block S220 can also account for the distance between the customer and each store location in the set of store locations—in addition to queue lengths—in selecting a particular store location in order to minimize the total time between receiving a pre-order from the customer (e.g., while the customer walks toward his destination) and delivering the order to the customer. In another example, Block S220 can access an account of the customer, identify a previous food order (e.g., including a custom drink order) submitted by the customer, and select a store location that is both within the threshold range of the customer and can fulfill the items specified in previous food order (e.g., the customer drink order). In this example, Block S220 can predict that the customer will submit a pre-order similar to the previous order (or include one or more items specified in the previous order), such as based on the customer habits or multiple previous customer orders, and thus select a nearby store location that can fulfill items in the predicted pre-order.

Additionally or alternatively, Block S220 can identify a set of store locations within the threshold range of the customer, present a list and/or map of the set of store locations to the customer through the user interface within the native application executing on the mobile computing device, and receive a selection for a particular store location from the customer through the user interface. However, Block S220 can function in any other way to return a set of store locations, to select a particular store location, and/or to receive a customer selection of one or more store locations from the set of store locations.

As shown in FIG. 6, Block S230 of second method S200 recites selecting a menu of food items fulfilled by the store location. Generally, Block S230 functions to retrieve a menu of food items fulfilled by the particular store location such that available menu items can be displayed to and selected by the customer through the user interface. For example, second method S200 can applied across a set of store locations under a single franchise, wherein at least one menu items (e.g., a latte with almond milk and chocolate sprinkles) is fulfilled by only a subset of the store locations—that is, not all store locations in the set of store locations feature the same menu despite their associated with a single franchise. For example, only some store locations under a particular franchise may be equipped with a particular type of coffee maker. Vendors under different brands or franchises may similarly maintain unique menus. Therefore Block S230 can retrieve a current menu for the selected store location such that the capacity of the selected store location to fulfill the customer's food order can be substantially guaranteed. For example, Block S230 can retrieve a menu of food items from a database of menus and present the menu of food items to the customer through the user interface. Block S230 can also interface with the selected store to identify current supply shortages at the selected store and modify the menu of food items provided to the user accordingly. For example, Block S230 can receive a notification from the selected store location that its supply of almond milk has been or will be exhausted shortly, and Block S230 can update the menu presented to reflect the almond milk shortage. As in this example, Block S230 can also interface with Block S220 to select a store location without a shortage or without a shortage affecting a predicted item of the customer's pre-order.

Block S230 can further display the menu through the user interface and can interface with Block S240 to enable the customer to select one or more items from the menu to create a food order. However, Block S220 can function in any other way to select a menu of food items fulfilled by the store location and/or to display all or a portion of the menu for the customer.

Figure 9:
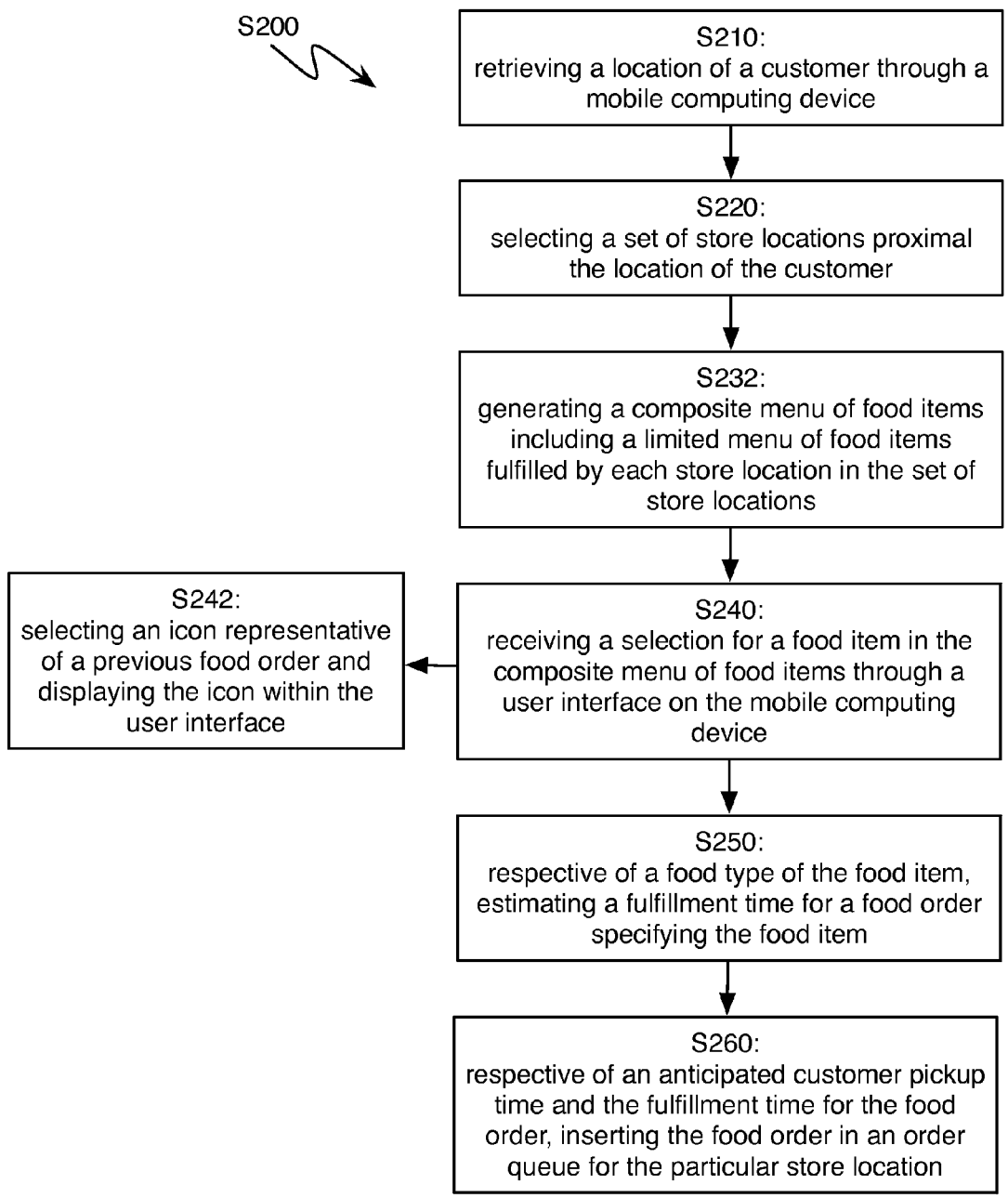
FIG. 9 is a flowchart representation of a variation of the second method.

As shown in FIG. 9, one variation of second method S200 includes Block S232, which recites generating a composite menu of food items including a limited menu of food items fulfilled by each store location in the set of store locations. As described above, local store locations of the same or different brand can offer unique menu items, and Block S232 can therefore generate a composite menu of food items that includes all items available through the multiple store locations. For example, Block S232 can access a database of stored menus for the set of store locations proximal the customer, such as described above, and combine the items from the various menus into a single composite menu.

Furthermore, once the customer selects one (or an additional) food item from the composite menu as described below, Block S232 can update the composite menu to exclude food items unique to one or a subset of the store locations that cannot fulfill the food item recently added to the food order by the customer. For example, Block S232 can receive a selection for a food item from the customer, select a subset of store locations, from the set of local store locations, that can supply the food item, generate a second composite menu (i.e., an updated composite menu) of food items including a limited menu of food items fulfilled by each store location in the subset of store locations, and display the second composite menu of food items to the customer through the user interface. Therefore, for the variation of second method S200 in which the store location is not selected prior to a first food item selection, Block S232 can update the composite menu to substantially ensure that a local store location can fulfill all items in the customer's food order.

Block S232 can also implement methods similar to Block S230 described above to display the composite menu of food items through the user interface. However, Block S232 can function in any other way to generate, display, and/or update a composite menu of food items including food items fulfilled by multiple store location in a set of local store locations.

Block S240 of second method S200 recites receiving the food order from the customer through a user interface on the mobile computing device, the food order specifying a food item from the limited menu of food items. Block S240 can similarly recite receiving a selection for a food item in the composite menu of food items through a user interface on the mobile computing device, the food item fulfilled by a particular store location in the set of store locations. Generally, Block S240 functions to collect a food pre-order specifying one or more food items from the (composite) menu of food items fulfilled by the store location. In one example implementation, Block S230 displays the (composite) menu as a list of items with representative photo or image within the user interface, and Block S240 builds the food order by added each item selected by the customer through a touchscreen of the mobile computing device. Block S240 can also enable the customer to customize a selected food item. For example, Block S230 can display a list of coffee-based beverages and/or hot beverages including a latte, and Block S240 can receive a latte selection from the customer, direct the customer to a latte customization page, and receive customer selections for any of size (e.g., small, medium, large), number of shots of espresso (e.g., one, two, or three), milk type (e.g., almond milk, soy milk, 2% milk, crème), topping (e.g., whipped cream, chocolate sprinkles, cinnamon). Block S240 can thus assemble a complete food order including one or more food items based on customer selections through the user interface.

Block S240 can also collect payment information from the customer. In one example, Block S240 prompts the customer to enter payment information (e.g., a credit card number) through the user interface. In another example, Block S240 accesses payment information previous entered by the customer, such as for a previous pre-order. However, Block S240 can function in any other way to receive the food order from the customer.

As shown in FIG. 9, one variation of second method S200 includes Block S242, which recites selecting an icon representative of a previous food order and displaying the icon within the user interface. Generally, Block S242 functions to retrieve a previous food pre-order submitted by the customer and to enable straightforward (e.g., one-click) duplication of the previous pre-order through selection of an icon representative of the previous pre-order.

In one implementation, Block S242 generates a representative order icon summarizing selected food items in the previous food order. Block S242 can thus create a visualization that enables the customer to visually discern the previous pre-order food prior to submission of a duplicate order. The representative order icon can include a graphical icon and can incorporate a modification indicating a customized item within the pre-order. In one implementation, Block S242 generates the representative order icon that includes a group of combined or discrete (e.g., adjacent) icons, wherein each icon represents a particular (aspect of a) selected food item. For example, Block S242 can generate a graphical representative order icon for a beverage indicating beverage size (e.g., size of cup), beverage type (e.g., espresso cup, cappuccino cup, coffee mug), beverage temperature (e.g., steam or ice) and/or any additional flavorings (e.g., vanilla bean, hazelnut, or colored droplets). The representative order icon can additionally or alternatively include text for clarification, such as selected from a table of rules or input by the user. For example, a graphical representation of a medium cup (with text reading "medium latte") grouped with graphical representations of a vanilla bean and blocks of ice can collectively indicate a medium iced vanilla latte. Alternatively, Block S242 can generate the representative order icon that additionally or alternatively includes a text representation or description of the food order. However, Block S242 can generate the representative order icon that is of any other form and describes the previous food order in any other suitable way.

Block S242 can further display the representative order icon within the user interface on the mobile computing device. Block S250 can also display an order submission icon adjacent the representative order icon, wherein the customer can select the submission icon to submit a duplicate order to a store location. Alternatively, the representative order icon can function as a submit button, wherein the customer can select the representative order icon to submit a duplicate order to a store location. Therefore, Block S242 can enable the customer to quickly confirm and submit a food order with a single gesture (e.g., a click, a tap, a swipe) through the user interface executing on the mobile computing device. Block S242 can additionally or alternatively enable the user to submit the order with a voice command (e.g., through speech interpretation software executing on the mobile computing device) or through any other suitable input type.

As shown in FIG. 4E, the representative order icon and/or the order submission icon (which can be combined into a single icon or displayed together, such as adjacent to one another) can be displayed on the screen of the mobile computing device. As shown in FIG. 4F, the representative order icon and/or the order submission icon can alternatively be displayed with additional confirmation information (e.g., text order summary, store location, and/or payment information). The order icon and/or the order submission icon can alternatively be displayed separately. For example, the representative order icon can be displayed on a first page displayed within the user interface, and, following a predetermined period of time and/or confirmation by the customer, the order submission icon can be displayed on a subsequent page within the user interface. The order submission icon can be any suitable input region (e.g., a large button or a link) that indicates that selection of the input region will submit the pre-order to a store location for fulfillment. For example, the order submission icon can include a button labeled "submit", "go", or "order." The button can be any suitable color and/or shape.

Therefore, Block S240 can interface with Block S242 to receive a food order from the customer through selection of the icon, and Block S240 can further cooperate with Block S260 to submit the food order to the store location. However, Block S240 and/or S242 can function in any other way to receive the food order from the customer, to select an icon representative of a previous food order, and/or to display the icon within the user interface.

Block S250 of second method S200 recites, respective of a food type of the food item, estimating a fulfillment time for the food order. Generally, Block S250 function to predict the start-to-finish time of the one or more food items in the customer's food order. In one example, Block S250 accesses fulfillment times for previous orders, such as stored on a remote database, and estimates the fulfillment time for the customer's food order based on fulfillment times for previous orders fulfilled by the store location. In another example, Block S250 accesses general (e.g., average or predicted) item fulfillment times for a chain of store location and estimates the fulfillment time for the customer's food order based on the general fulfillment times. However, Block S250 can function in any other way to predict a total amount of time needed to fulfill one or more items in the customer's food order.

Block S260 of second method S200 recites, respective of an anticipated customer pickup time and the fulfillment time for the food order, inserting the food order between two previous food orders in an order queue for the store location. Generally, Block S260 functions to submit the food order to a particular store location and to queue the food order at the particular store location to meet a time objective for delivery of the food order to the customer.

In one implementation, Block S260 estimates the anticipated customer pickup time based on the location of the customer, the location of the store location, and a determined speed of the customer toward the store location. For example, Block S260 can determine a current distance between the customer and the store location, predict a path taken by the customer to arrive at the store location, retrieve data pertaining to road or foot traffic between the customer's location and the store location, determine the customer's transportation means (e.g., walking, driving) based on location change rate of the customer, and combine the foregoing information to estimate a time (elapsed time or time of day) when the customer will arrive at the store location. Furthermore, by subtracting the estimated fulfillment time for the food order and/or a time-based tolerance (e.g., ±one minute of the customer's arrival at the store location), Block S260 can specify a particular order fulfillment start time at the store location. For example, Block S260 can implement an order completion tolerance that specifies completion of the customer's food order within a threshold time of the anticipated customer pickup time. Block S260 can also retrieve order fulfillment times of food orders preceding the food order in the order queue to insert the customer's food order between two previous-entered food orders. Block S260 can also prioritize orders submitted remotely (i.e., pre-orders submitted through second method S200) over in-store orders and/or prioritize smaller orders over large orders, through Block S260 can prioritize orders in the queue according to any other information or factor.

Alternatively, Block S260 can receive the anticipated customer pickup time directly from the customer. For example, Block S260 can prompt the customer to enter a predicted arrival time at the store location into the user interface. Block S260 can implement this information to queue the customer's food order at the store location similar to second method S200s described above.

In the variation of second method S200 in which the store location is not selected prior to customer selection of a food item, if multiple store locations can fulfill all items in the food order, Block S260 can further display the multiple store locations through the user interface and prompt the customer to select a particular store location to fulfill the food order. Once the store location is selected (e.g., automatically or by the customer) and the customer selects a 'submit' input region within the user interface, Block S260 can transmit the food order to the selected store location. Block S260 can also submit queue specifics, such as the order, timing, and/or desired completion time of the customer's food order, to the store location. For example, Block S260 can transmit data pertaining to the customer's food order over a network communication protocol, such as over the Internet.

Figure 7:
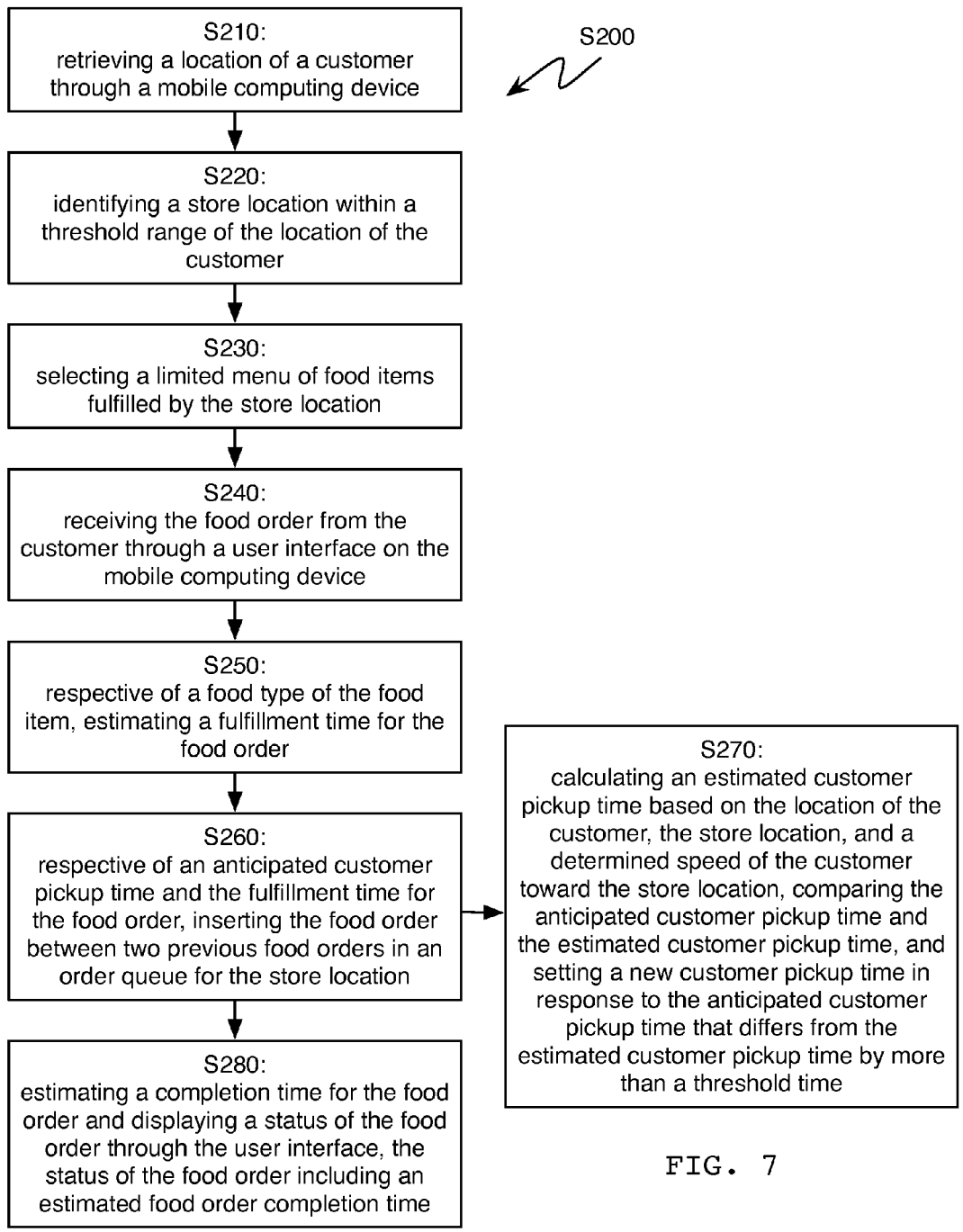
FIG. 7 is a flowchart representation of a variation of the second method.

As shown in FIG. 7, one variation of second method S200 includes Block S270, which recites calculating an estimated customer pickup time based on the location of the customer, the store location, and a determined speed of the customer toward the store location, comparing the anticipated customer pickup time and the estimated customer pickup time, and setting a new customer pickup time in response to the anticipated customer pickup time that differs from the estimated customer pickup time by more than a threshold time. In a variation in which the customer enters a pickup time, such as through the user interface, Block S270 can compare the manually-entered pickup time with an estimated pickup time based on the customer's proximity to (i.e., distance from) the selected store location and a speed of the customer toward the store location, as described above. If the customer's entered pickup time and the estimated pickup time differ by more than a threshold period of time, such as five minutes, Block S270 can modify the pickup time to substantially ensure that the food order will be completed within a threshold time of the customer's arrival to the store location, such as one minute. Block S270 can further transmit the new customer pickup time to the store location. However, Block S270 can function in any other way to set a new customer pickup time for the customer's food order.

As shown in FIG. 7, one variation of second method S200 includes Block S280, which recites estimating a completion time for the food order and displaying a status of the food order through the user interface, the status of the food order including an estimated food order completion time. Generally, Block S280 functions to interface with the store location to retrieve a substantially real-time status of the customer's food order. For example, Block S280 can retrieve the food order status from the store location via an Internet connection and transmit the order status to the customer's mobile computing device, wherein the user interface displays the order status for the customer as the customer moves (e.g., walks or drives) toward the store location. The customer can thus see when his order will be completed and adjust his pace accordingly, such as by walking faster or driving slower. However, Block S280 can function in any other way to provide food order status information to the customer substantially in real time.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for submitting a food order remotely, comprising:
   generating a graphical icon representing a food item and a customization option for the food item selected by a customer by selecting a stock image that visually depicts the food item and a stock overlay that visually depicts the customization option and superimposing the stock overlay over the stock image;
   associating the icon with a payment option;
   determining a location of the customer based on an output of a location sensor within a mobile computing device associated with the customer;
   selecting a set of store locations based on the location of the customer;
   filtering the set of store locations based on availability of the food item from each store location in the set of store locations;
   associating the icon with a store location in the set of filtered store locations to fulfill the food item;
   displaying the icon, representing the food item and the customization option for the food item by the superimposed stock overlay over the stock image, on a display of the mobile computing device as an application icon on a home screen of the mobile computing device;
   in response to receiving a selection of the icon, submitting a food order specifying the food item, the customization option, and the payment option to the store location;
   in response to receiving the selection of the icon, displaying an order cancellation button on the home screen of the mobile computing device for a threshold period of time;
   in response to the threshold period of time having expired, displaying a notification that the food order can no longer be canceled on the home screen of the mobile computing device; and
   in response to a selection of the order cancellation button within the threshold period of time, identifying the food order as inadvertent, and submitting an order cancellation request to the store location.

2. The method of claim 1, wherein generating the icon comprises prompting the customer to select a favorite coffee drink, to select a favorite size of the coffee drink, and to select a favorite milk option for the coffee drink, and wherein selecting the stock image comprises selecting the stock image representing the favorite coffee drink in the favorite size and selecting the stock overlay representing the favorite milk option.

3. The method of claim 2, wherein generating the icon comprises prompting the customer to enter a description for the favorite coffee drink and arranging text comprising the description adjacent the stock image.

4. The method of claim 1, wherein submitting the food order to the store location comprises submitting the food order to the store location in response to selection of the application icon from the home screen.

5. The method of claim 1, wherein submitting the food order to the store location comprises transmitting the food order to the store location over a cellular network connection.

6. The method of claim 1, wherein submitting the food order comprises displaying a receipt of the food order on the display of the mobile computing device, the receipt specifying the food item, the customization option, the payment option, and the store location.

7. The method of claim 1, wherein associating the icon with the store location comprises receiving an estimated food order fulfillment time for each store location in the set of filtered store locations and associating the icon with the store location based on a lowest estimated wait time for the store location.

8. The method of claim 1, wherein associating the icon with the store location comprises associating the icon with the store location based on a previous purchase from the store location by the customer.

9. The method of claim 1, wherein selecting the set of store locations comprises selecting a set of store locations corresponding to a plurality of franchises.

10. The method of claim 1, wherein selecting the set of store locations comprises selecting a set of store locations corresponding to a franchise specified in a purchase history of the customer.

11. The method of claim 1, wherein selecting the set of store locations comprises determining that the user is on foot and selecting the set of store locations within walking distance of the user.

12. The method of claim 1, wherein
   generating the icon comprises prompting the customer to select a favorite item, to select a favorite size of the item, and to select a favorite option for the item, and
   selecting the stock image comprises selecting the stock image representing the favorite item in the favorite size and selecting the stock overlay representing the favorite option.

* * * * *